US011902230B1

(12) United States Patent
Teng

(10) Patent No.: US 11,902,230 B1
(45) Date of Patent: Feb. 13, 2024

(54) GENERATING AND MANAGING MESSAGE CORRECTION AND RETRACTION HISTORY FROM A CHAT SERVER

(71) Applicant: Fortinet, Inc., Sunnyvale, CA (US)

(72) Inventor: Teng Teng, Kanata (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 17/957,963

(22) Filed: Sep. 30, 2022

(51) Int. Cl.
*H04L 51/063* (2022.01)
*H04L 51/216* (2022.01)
*H04L 51/04* (2022.01)

(52) U.S. Cl.
CPC ............ *H04L 51/063* (2013.01); *H04L 51/04* (2013.01); *H04L 51/216* (2022.05)

(58) Field of Classification Search
CPC ..... H04L 51/04; H04L 51/063; H04L 51/216; H04L 51/02; H04L 41/026; H04L 41/5093; H04L 65/1101; H04L 12/183; H04N 21/4788
See application file for complete search history.

(56) References Cited

U.S. PATENT DOCUMENTS

| | | | | |
|---|---|---|---|---|
| 6,954,902 B2* | 10/2005 | Noma | ................... | G06F 16/954 715/753 |
| 2003/0017873 A1* | 1/2003 | Ohara | ..................... | A63F 13/12 463/1 |
| 2012/0181330 A1* | 7/2012 | Kim | ........................ | G06Q 30/02 235/375 |
| 2017/0337176 A1* | 11/2017 | Cietwierkowski | ... | G06Q 10/107 |
| 2018/0367483 A1* | 12/2018 | Rodriguez | ............ | H04L 51/046 |

* cited by examiner

*Primary Examiner* — Michael Won
(74) *Attorney, Agent, or Firm* — Law Office of Dorian Cartwright; Dorian Cartwright

(57) ABSTRACT

Changes on a chat client, such as one or more edits or retractions, and is characterized relative to an original chat string, and uploaded to a chat server for storage. The chat server combines the message change with at least a second change to the specific chat string uploaded from a different chat client. Responsive to a regeneration of the chat string on the chat client, the chat daemon downloads the combined message change from the chat server. The edits and retractions originating from the chat client and the edits and retractions originating from the second chat client are downloaded and applied to the specific chat string for display in the chat client.

3 Claims, 5 Drawing Sheets

US 11,902,230 B1

GENERATING AND MANAGING MESSAGE CORRECTION AND RETRACTION HISTORY FROM A CHAT SERVER

FIELD OF THE INVENTION

The invention relates generally to computer networking, and more specifically, for generating and managing message correction and retraction history across different chat clients.

BACKGROUND

Many Instant Messaging solutions generate the message correction and retraction history from the client side. However, the client will lose all the past message history after the IM apps are reinstalled. Even if it can keep the past history it is low efficiency to re-generate the full message history in the client side.

Another defect of the existing solutions is that it is hard to provide a unified and consistent message correction and retraction history record for multiple devices with the same chat account.

Therefore, what is needed is a robust technique for generating and managing message correction and retraction history across different chat clients.

SUMMARY

These shortcomings are addressed by the present disclosure of methods, computer program products, and systems for generating and managing message correction and retraction history across different chat clients.

In an embodiment, a change to a specific chat string is detected. The change can be one or more edits or retractions, and is characterized relative to an original chat string. The chat daemon uploads the message change to the chat server for storage in association with a specific user. An embodiment of the chat server combines the message change with at least a second change to the specific chat string uploaded from a different chat client.

Responsive to a regeneration of the chat string on the chat client, the chat daemon downloads the combined message change from the chat server. The regeneration can be due to app uninstall/reinstall, device power off/power on, a new device, and the like. The edits and retractions originating from the chat client and the edits and retractions originating from the second chat client are downloaded and applied to the specific chat string for display in the chat client.

Advantageously, chat client performance and user experience are improved.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for steering network traffic on heterogenous links in SDWAN based on remote cost.

One of ordinary skill in the art will recognize many additional variations made possible by the succinct description of techniques below.

Figure 2:
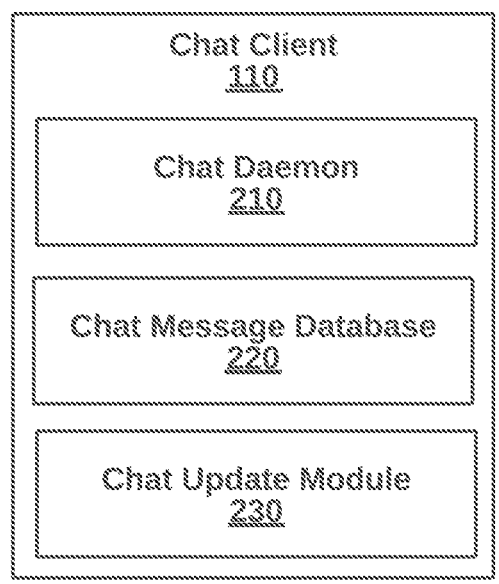
FIG. 2 is a more detailed block diagram illustrating a chat client of the system of FIG. 1, according to an embodiment.
Figure 3:
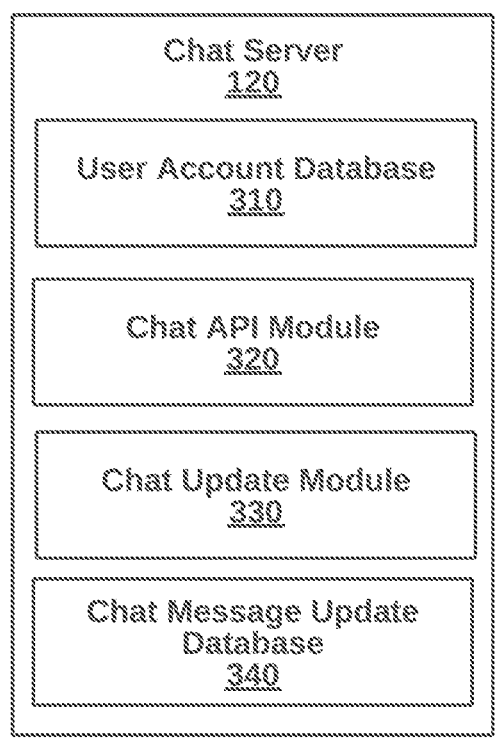
FIG. 3 is a block diagram illustrating a chat server of the system of claim 1, according to an embodiment.

I. Systems for Chat Client Message Updates (FIGS. 1-3)

Figure 1:
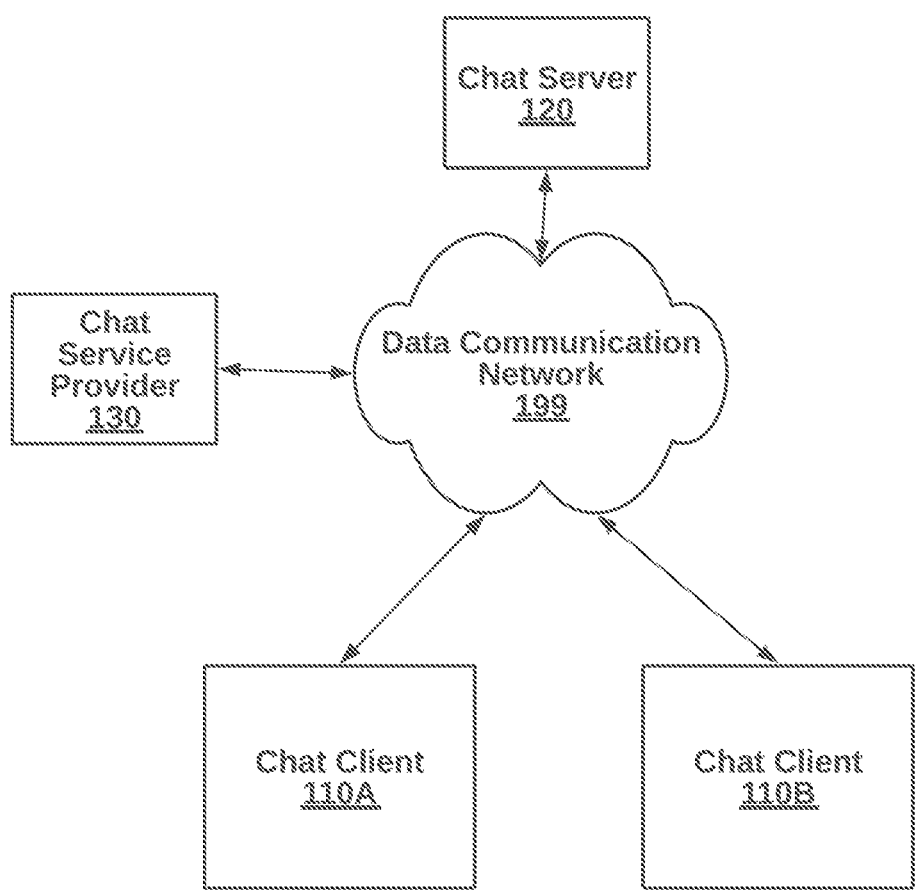
FIG. 1 is a high-level block diagram illustrating a system for generating and managing message correction and retraction history across different chat clients, according to an embodiment.

FIG. 1 is a high-level illustration of a system 100 for generating and managing message correction and retraction history across different chat clients, according to an embodiment. A system 100 comprise a chat clients 110A,B, a chat server 120, and chat service provider 130, coupled to a data communication network 199. Local and remote are relative terms depending on which side of the SDWAN is building VPNs (Virtual Private Networks). Many variations are possible, including additional chat clients and chat servers, access points, gateways, router, switches, firewalls, and other network components.

The components of the system 100 are coupled in communication over the data communication network 199. Preferably, the access point 110 connected to the data communication system via hard wire, such as chat client 110A,B, chat server 120 and chat service provider 130. The data communication network 199 can be any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11.

The chat clients 110A,B provide message chat strings between users one or one or one to many. In some cases, chat strings are between a user and an automated process or even process to process. One implementation receives user input from a keyboard, a telephone virtual keyboard, a microphone, or the like, and displayed in a user interface. The message is encrypted and sent over the data communication network 199 to a different chat client. Responses messages are received and displayed to track the back and forth.

At times, a user may desire to change an already sent chat message due to errors, regrets, irrelevance, or other factors. Different implementation provide different capabilities, such as changing the text of an old message to the new content. One case unsends an old message and resends a new message. Another case retracts the message altogether without any further action. The changes can appear in different colors to alert the sender, but appear unitary on the receiver side, as not to draw attention to the change. A status can be updated for a message as an indicator of change. Another case shows an updated message with a revision history and time stamps nested within individual changes. Many different variations are possible.

The chat clients 110A,B can be an app or an app running on a device, in different contexts. The device can be dedicated to messaging or be a multifunctional device. Non-limiting examples of chat apps include Whats App, Facebook Messenger, Instagram Messenger, AOL Instant Messenger, a custom messenger, and a messenger integrated into a primary application such as Google Drive or Microsoft Word. Another embodiment of the chat clients 110A,B are disposed upon an Ejabberd platform.

The chat server 120 stores changes and combines changes from different sources. The changes can be stored, in one embodiment, without content based on user preferences. In another embodiment, a user logs into a chat app at client 110A to send a chat message, and then the later the same user logs into a chat app at client 110B, and makes a change to the chat message. The change can be uploaded from the client 110B to the chat server 120 and then downloaded to the client 110A to synchronize. If either client 110A or client 110B needs to regenerate a message, changes from all sources can be combined and downloaded for a complete update of message content.

The chat service provider 130 can be a service provider that connects chat clients 110A,B with a secure channel for communication. A friends list can show who is online and who is available for a chat. Chat rooms can be hosted for different users to enter and leave at leisure. In another embodiment, the chat service provider 139 is integrated with the chat server 120, as a proprietary device. In yet another embodiment, the chat clients 110A,B are only aware of the chat service provider 130 and message editing and retraction is a transparent, back-end service that appear to users to be provided by the chat service provider 130.

FIG. 2 is a more detailed block diagram illustrating the chat client 110 (referring collectively to chat clients 110A,B) of the system 100 of FIG. 1, according to one preferred embodiment. The chat client 110 comprises a chat daemon 210, a chat message database 220 and a chat update module 230.

A chat daemon 210, in an embodiment, detects a change to a specific chat string. The change can be one or more edits or retractions. The chat daemon 210 can also upload changes to a chat server, for storage in association with a particular user. When regeneration of chat messages is necessary, changes can be downloaded from the chat server.

The chat message database 220 can store original messages. In one case, message content is encrypted and stored only on the chat client to maintain maximum privacy and control. If an app is uninstalled and reinstalled, the data can be preserved and reloaded for regenerating old messages.

A chat update module 230 can characterize the one or more edits and retractions for the specific chat string relative to an original chat string. The changes can described by XML, change codes, or some other technique. Responsive to a regeneration of the chat string on the chat client, the combined message changes downloaded from the chat server are applied. In more detail, the edits and retractions originating from the chat client and applying the edits and retractions originating from the second chat client (or additional chat clients), to the specific chat string for display in the chat client.

FIG. 3 is a block diagram illustrating the chat server 120 of FIG. 1, according to an embodiment. The chat server 120 includes a user account module 310, a chat Application Programming Interface (API) module 320, a chat update module 330, and a chat message update database 340.

The user account module 310 can set up various chat users and link various chat clients, chat apps, and user devices. The chat API module 320 can provide secure communications with various chat clients, chap apps and user devices for uploading and downloading changes. In some embodiments, APIs are also used to communicate with a cloud-based chat provider service directly. Information can be exchanged regarding a specific user or a specific app, such as updates to user credentials or chat protocols, for example.

The chat update module 330 combines the message changes from multiple chat clients, for a common message string. Using a message identifier, changes made at different sources can be combined in order to have a complete record of edits and retractions. Furthermore, offline devices can come online to get updates to chat messages, as needed.

The chat message update database 340 stores the chat message changes for multiple users. In one case, only changes are stored in order to save space. The chat content itself resides at the chat client to maintain privacy. Updates can be stored message identification, user identification, sender, user app identification, device identification, IP/port address, and the like.

II. Methods for Chat Client Message Updates (FIG. 4)

Figure 4:
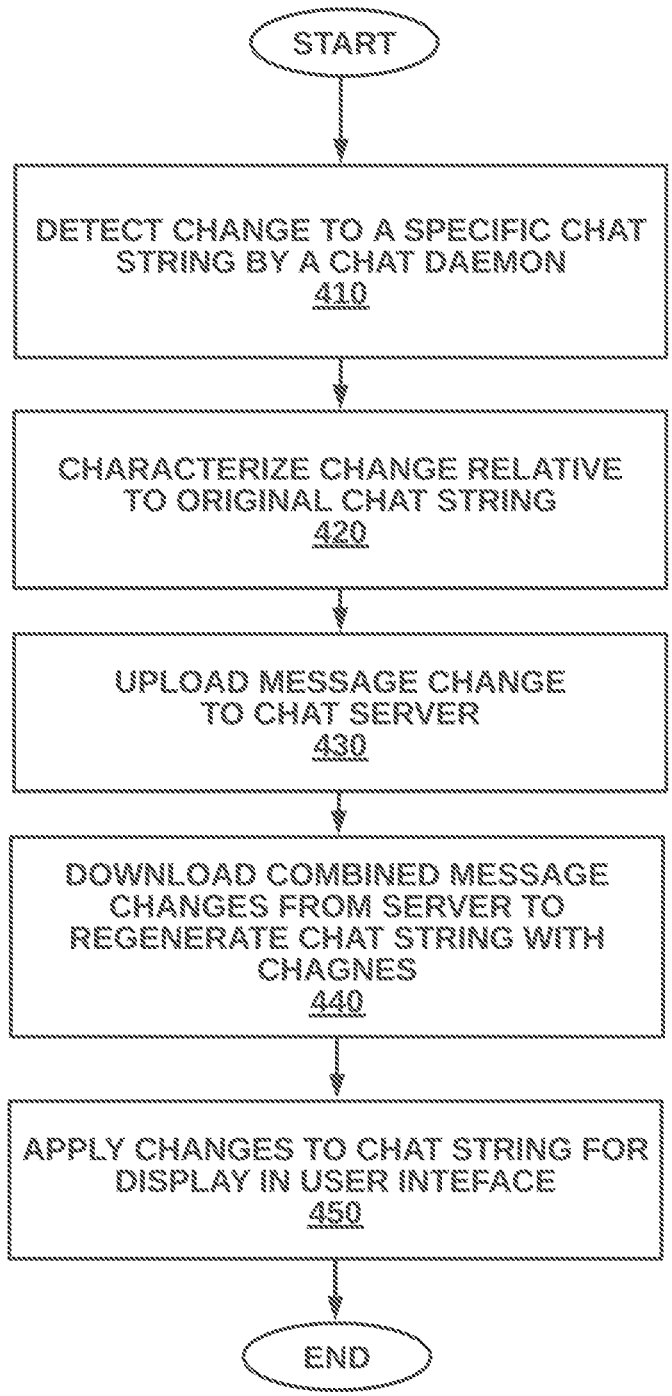
FIG. 4 is a high-level flow diagram illustrating a method for generating and managing message correction and retraction history across different chat clients, according to an embodiment.

FIG. 4 is a high-level flow diagram illustrating a method for generating and managing message correction and retraction history across different chat clients, according to one embodiment. The method 400 can be implemented, for example, by the system 100 of FIG. 1. The steps are merely representative groupings of functionality, as there can be more or fewer steps, and the steps can be performed in different orders. Many other variations of the method 400 are possible.

At step 410, a change to a specific chat string is detected by a chat daemon. At step 420, the change is characterized by of the one or more edits and retractions for the specific chat string relative to an original chat string. At step 430, the message change can be uploaded to the chat server for storage in association with a specific user, wherein the chat server combines the message change with at least a second change to the specific chat string uploaded from a different chat client.

At step 440, responsive to a regeneration of the chat string on the chat client, the combined message change is downloaded from the chat server. At step 450, the edits and retractions originating from the chat client and the edits and retractions originating from the second chat client, are applied to the specific chat string for display in the chat client III. Generic Computing Environment (FIG. 5)

Figure 5:
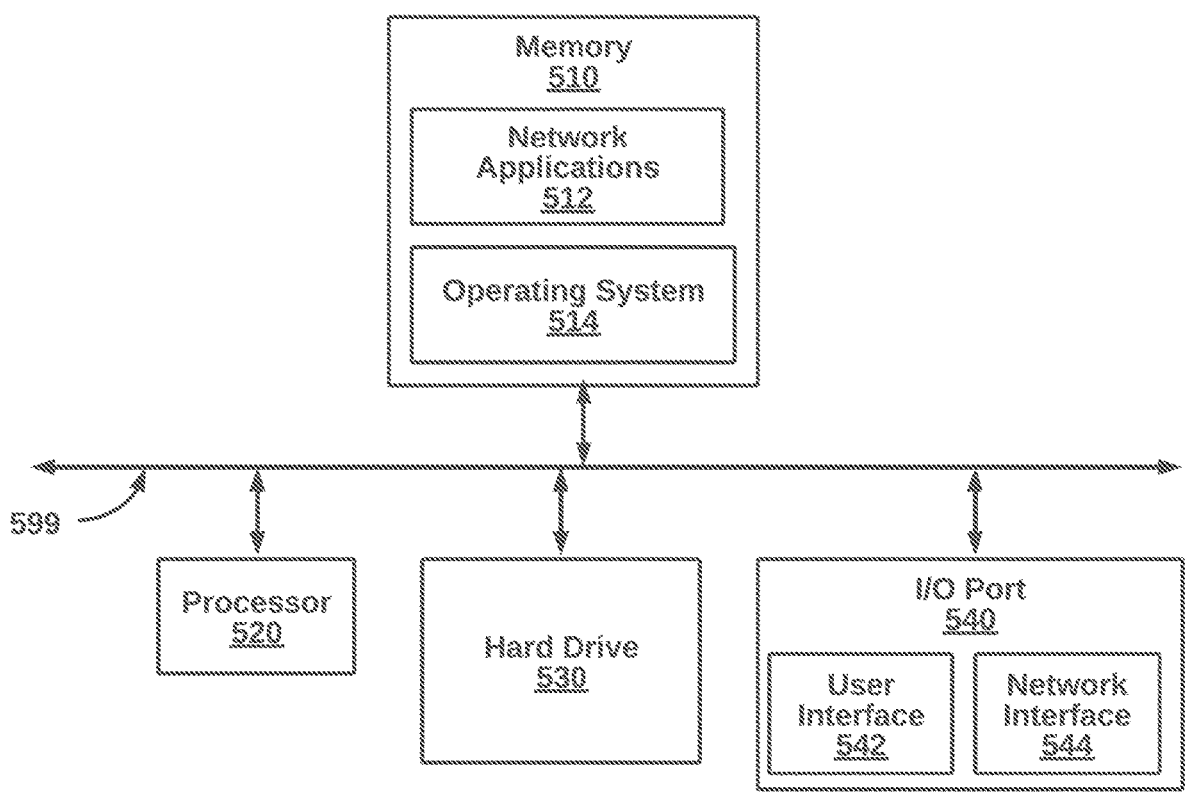
FIG. 5 is a general computing environment for implementing the system of FIG. 1, according to an embodiment.

FIG. 5 is a block diagram of a computing environment 500, according to an embodiment. The computing environment 500 includes a memory 505, a processor 522, a storage drive 530, and an I/O port 540. Each of the components is coupled for electronic communication via a bus 599. Communication can be digital and/or analog and use any suitable protocol. The computing environment 500 can be a networking device (e.g., chat client 110, chat server 120, an access point, a firewall device, a gateway, a router, or a wireless station).

The memory 510 further comprises network applications 512 and an operating system 514. The network applications 512 can include a web browser, a mobile application, an application that uses networking, a remote application executing locally, a network protocol application, a network management application, a network routing application, or the like.

The operating system 514 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 522 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 522 can be single core, multiple core, or include more than one processing elements. The processor 522 can be disposed on silicon or any other suitable material. The processor 522 can receive and execute instructions and data stored in the memory 222 or the storage drive 530.

The storage drive 530 can be any non-volatile type of storage such as a magnetic disc, EEPROM (electronically erasable programmable read-only memory), Flash, or the like. The storage drive 530 stores code and data for applications.

The I/O port 540 further comprises a user interface 542 and a network interface 544. The user interface 542 can output to a display device and receive input from, for example, a keyboard. The network interface 544 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A chat client to generate and manage message correction and retraction history across different chat clients, the chat comprising:
   a processor;
   a network interface communicatively coupled to the data communication network and to the enterprise network; and
   a memory, communicatively coupled to the processor and storing:
   a chat database to store chat message content from multiple chat strings;

a chat daemon on the chat client, to detect a change to a specific chat string, the change comprising one or more edits or retractions;

a chat update module characterizing the change of the one or more edits and retractions for the specific chat string relative to an original chat string, wherein the chat daemon uploads the message change to the chat server for storage in association with a specific user, wherein the chat server combines the message change with at least a second change to the specific chat string uploaded from a different chat client, and wherein responsive to a regeneration of the chat string on the chat client, the chat daemon downloads the combined message change from the chat server, and a chat change module applies the edits and retractions originating from the chat client and the edits and retractions originating from the second chat client, to the specific chat string for display in the chat client.

2. A method in a chat client for generating and managing message correction and retraction history across different chat clients, the method comprising the steps of:

detecting, by a chat daemon on the chat client, a change to a specific chat string, the change comprising one or more edits or retractions;

characterizing the change of the one or more edits and retractions for the specific chat string relative to an original chat string;

uploading the message change to the chat server for storage in association with a specific user, wherein the chat server combines the message change with at least a second change to the specific chat string uploaded from a different chat client;

responsive to a regeneration of the chat string on the chat client, downloading the combined message change from the chat server; and applying the edits and retractions originating from the chat client and applying the edits and retractions originating from the second chat client, to the specific chat string for display in the chat client.

3. A non-transitory computer-readable media in a chat client, implemented at least partially in hardware for, when executed by a processor, for generating and managing message correction and retraction history across different chat clients, the method comprising the steps of:

detecting, by a chat daemon on the chat client, a change to a specific chat string, the change comprising one or more edits or retractions;

characterizing the change of the one or more edits and retractions for the specific chat string relative to an original chat string;

uploading the message change to the chat server for storage in association with a specific user, wherein the chat server combines the message change with at least a second change to the specific chat string uploaded from a different chat client;

responsive to a regeneration of the chat string on the chat client, downloading the combined message change from the chat server; and applying the edits and retractions originating from the chat client and applying the edits and retractions originating from the second chat client, to the specific chat string for display in the chat client.

* * * * *